United States Patent [19]

Ross et al.

[11] 4,312,324
[45] Jan. 26, 1982

[54] WIND LOSS PREVENTION FOR OPEN CAVITY SOLAR RECEIVERS

[75] Inventors: Don H. Ross, Newton, Mass.; Theodore J. Nussdorfer, Nashua, N.H.

[73] Assignee: Sanders Associates, Inc., Nashua, N.H.

[21] Appl. No.: 160,036

[22] Filed: Jun. 16, 1980

Related U.S. Application Data

[63] Continuation of Ser. No. 932,170, Aug. 9, 1978, abandoned.

[51] Int. Cl.³ .............................. F24J 3/02; A62B 7/00
[52] U.S. Cl. .................................................. 126/418
[58] Field of Search ................... 126/424, 438, 418; 128/141 R

[56] References Cited

U.S. PATENT DOCUMENTS

| 897,290 | 9/1908 | Jacobs | 128/141 R |
| 2,182,222 | 12/1939 | Courtis | 126/424 |
| 4,069,812 | 1/1978 | O'Neill | 126/439 |

Primary Examiner—Samuel Scott
Assistant Examiner—G. Anderson
Attorney, Agent, or Firm—Louis Etlinger; Ronald Reichman

[57] ABSTRACT

Apparatus for minimizing thermal loss in a windowless, open cavity solar receiver due to airflow at the receiver aperture includes means for deflecting wind away from the cavity opening such that flow stream reattachment occurs away from the receiver aperture to provide a dead air zone at the cavity opening. This prevents turbulent-mixing airflow exchange between ambient air and heated air within the solar receiver. The wind deflector apparatus includes either a passive annular deflection foil at the receiver aperture, or an active device for producing an outwardly projected air jet at the receiver aperture.

3 Claims, 6 Drawing Figures

WIND LOSS PREVENTION FOR OPEN CAVITY SOLAR RECEIVERS

This is a continuation of application Ser. No. 932,170, filed Aug. 9, 1978, now abandon.

FIELD OF INVENTION

This invention relates to open cavity solar receivers and more particularly to a system for preventing thermal losses when these receivers are subjected to transient wind conditions.

BACKGROUND OF THE INVENTION

By way of background, solar receivers have, in the past, been mounted on towers adjacent a mirror field which redirects solar radiation and focuses it onto the solar receiver. As illustrated in co-pending application Ser. No. 612,434 of Philip O. Jarvinen assigned to the assignee hereof, it is possible to devise a closed cavity solar receiver in which the cavity carries a honeycomb heat exchanger and has a window positioned in the aperture of the cavity. Focused solar radiation passes through the window and impinges on the honeycomb heat exchanger at which time air flowing through the honeycomb is heated.

It is possible to eliminate the window and operate the receiver at ambient pressure, in which the air moving through the receiver is at 1 atmosphere. This type system is especially advantageous in large scale receivers capable, for instance, of collecting enough energy to power a 100 megawatt electric generator since large windows and support structure for the windows need not be provided.

One of the problems with operating an open cavity receiver is that the receiver is normally subjected to transient wind conditions which may cause an exchange of the receiver air with ambient resulting in losses of thermal energy from within the receiver through the cavity opening.

Absent airflow at the aperture of the receiver, the exchange between the heated air within the receiver and ambient is one of diffusion which operates relatively slowly and therefore results in only negligible heat loss. With airflow at the aperture of the solar receiver there is an order of magnitude increase in the exchange. This is primarily due to turbulent-flow exchange which involves the entraining of the quiescent gases at the aperture in a jet, which in the present case, is formed by the edge of the wind which dips toward the interface between the hot air in the receiver and the ambient.

This exchange can result in substantial losses which, in the present invention, are prevented by providing means for deflecting the "critical" streamline away from the receiver aperture. It will be appreciated that the further the streamline is deflected away from the aperture, the less will be the exchange. The "critical" streamline is the one closest to the receiver aperture and it is this streamline which is deflected from its natural position by a deflector such as an air foil or an active jet stream. Either one of these devices gives the airflow in the vicinity of the aperture momentum in a direction away from the aperture. As such, the present invention includes either a passive device with a specialized aerodynamic structure or active means for deflecting the wind away from the open end of the receiver so as to provide a dead air zone. As will be seen, the wind deflecting apparatus may be utilized with receivers which have a so-called "terminal concentrator" which concentrates focused solar radiation at the receiver aperture, or in situations in which no terminal concentration is utilized. When terminal concentrators are used, the deflection apparatus may be located at the lip of the concentrator. Otherwise, the deflection apparatus is located at the aperture of the receiver.

It should be noted that wind, in general, comes in horizontally. When terminal concentrators are used, the reattachment point for the flow stream occurs to the leeward side of the terminal concentrator away from the receiver aperture, if a deflection foil is used. In essence, wind impinging on the deflection foil produces a flow stream which displaces wind away from the aperture of the receiver thereby to form a dead air zone at the open end of the receiver. The only circulation at the receiver aperture is that due to low energy vortices which do not materially affect the operation of the receiver.

The active system includes in one embodiment the formation of outwardly projecting air jets at the lip of the terminal concentrator. This is simply accomplished by a channeled or perforated ring at the concentrator lip. These jets may be produced annularly or may only occupy as little as one-third the periphery of the ring. Pressurized air within the ring forms jets which project outwardly and deflect wind completely away from the receiver aperture.

It will be appreciated that solar energy receivers mounted in a central power tower in general face downwardly. However, for the most part, they are not vertically oriented but rather are tilted off the vertical axis by as much as 14°. Without the protection offered by the subject system, for positive angles of attack, the wind reattaches within or very close to the receiver aperture and large heat losses are experienced. Even for negative angles of attack the flow stream reattachment point may be sufficiently close to the open aperture to cause thermal loss.

With a tilted receiver as defined above, providing either the passive deflection foil or the active jet system, prohibits wind having either a positive or a negative angle of attack from affecting the operation of the receiver. The positive and negative angles of attack refer to the fore and aft direction with respect to the receiver orientation. It will be appreciated that wind coming in sidewise, in essence, has a zero angle of attack. However, with a zero angle of attack, thermal losses also occur, and it is advantageous to have either the passive or active wind deflection system for side gusts so that receiver thermal losses are held to acceptable levels.

It is, therefore, an object of this invention to provide an open cavity solar receiver with adequate protection against ambient wind conditions which would affect the operation of the receiver;

It is another object of this invention to provide either active or passive heat loss protection by providing the solar receiver with annular means for deflecting wind away from the aperture in the receiver cavity;

It is a still further object of this invention to provide an open cavity solar energy receiver with a heat exchanger in the cavity and means at the aperture of the cavity for providing a dead air zone thereat, thereby to prevent losses due to ambient wind conditions;

These and other objects of this invention will be better understood in connection with the following specification taken in conjunction with the appended drawings in which

DETAILED DESCRIPTION

Figure 1:
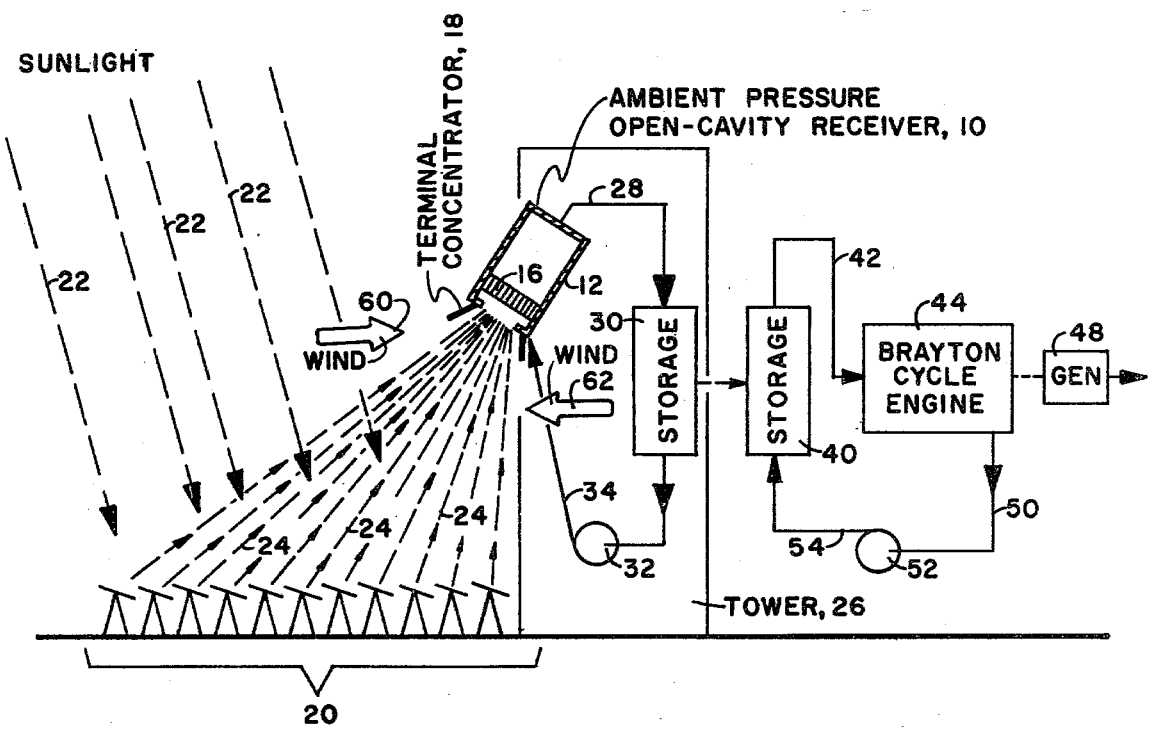
FIG. 1 is a diagrammatic representation of a central power tower type installation illustrating the utilization of an open cavity receiver and switchable storage, in which wind flow which may affect the thermal losses of the open cavity receiver is illustrated for the fore and aft directions.

Referring now to FIG. 1, an open cavity receiver 10 which operates at or close to ambient pressure is illustrated as having a cavity 12, an aperture 14, a heat exchanger 16 in the form of a ceramic honeycomb in the cavity and a terminal concentrator 18 or similar structure which, in general, has a frusto-conical shape and is located symmetrically about aperture 14 for redirecting stray radiation from a mirror field 20 into the receiver cavity. It will be appreciated that not all solar receivers need have terminal concentrators and that the subject systems for airflow deflection may be located at the receiver aperture if no terminal concentrator is used. Note: rays from the sun generally indicated by reference characters 22 are redirected by the mirrors of the mirror field as illustrated by rays 24 and are focused on heat exchanger 16. The mirrors track the movement of the sun during the day so as to maintain the sun focused onto the heat exchanger.

In one embodiment receiver 10 may be mounted in a central receiver tower 26 and may have an outlet line 28 connected to the inlet of a heat storage unit 30. The outlet of storage unit 30 is connected to a conventional blower type pumping system 32 which draws air through the storage unit and returns it over line 34 to the front end of the receiver cavity 12.

In operation, solar energy impinging on the heat exchanger causes the temperature of the heat exchanger to rise. Energy from the heat exchanger is then transferred to air from the illuminated end of the receiver. This air passes through the heat exchanger and out through line 28 to storage unit 30. When storage unit 30 is charged up, for instance, to a temperature of 2000° F., it is switched to the position indicated by storage unit 40 by conventional valve means. Storage unit 40 is discharged over line 42 to a conventional Brayton cycle engine 44 which is mechanically coupled to an electric generator 48. The outlet gas from the turbine section of the Brayton cycle engine is returned over line 50 to a pumping station 52 which pressurizes storage unit 40 via line 54 during the discharge of the storage unit.

It will be appreciated that in order to uniformly charge storage unit 30, the open cavity receiver should operate at close to ambient pressure. Ambient pressure is chosen so that structural constraints on the receiver configuration may be relaxed and to minimize pumping energy. What is desired is a uniform outlet temperature for the receiver and this may be maintained by controlling pumping system 32.

With strong airflow past the receiver aperture large heat losses occur. For wind impinging on the receiver from the direction indicated by arrow 60, this wind is said to impinge on receiver 10 with a positive angle of attack, whereas wind from the direction indicated by arrow 62 is said to impinge on the receiver with a negative angle of attack.

Figure 2A:
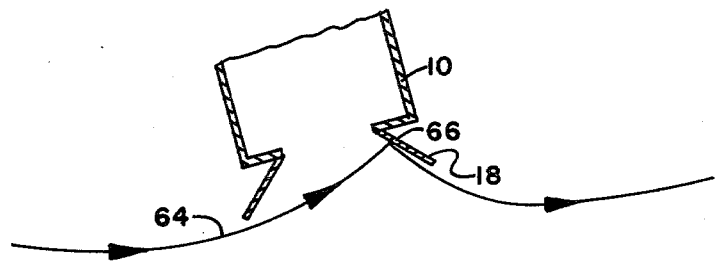
FIG. 2A is a diagrammatic representation of a receiver oriented such that airflow past the receiver arrives with a negative angle of attack.

Referring to FIG. 2A, receiver 10 is illustrated tilted such that the wind's major or primary streamline 64 impinges on the receiver with a negative angle of attack. In this case the reattachment point of the streamline as illustrated at 66 is located close to the aperture on terminal concentrator 18. As mentioned hereinbefore, turbulent mixing occurs at the aperture and heat is transferred across the aperture interface to the main streamline.

Figure 2B:
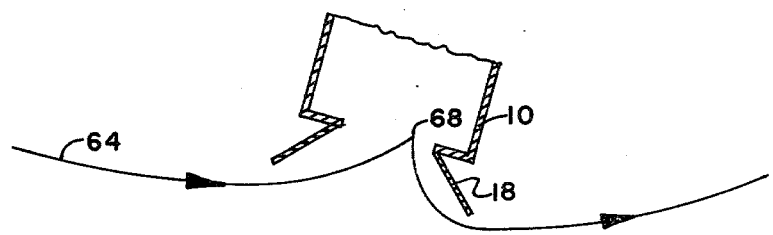
FIG. 2B is a diagrammatic representation of a receiver oriented such that airflow past the receiver arrives with a positive angle of attack.

As shown in FIG. 2B, a positive angle of attack is illustrated in which the main streamline reattaches at 68 within the receiver aperture. In this case there is an even more severe heat loss with the transfer of energy across the receiver aperture due to turbulent mixing.

Figure 3:
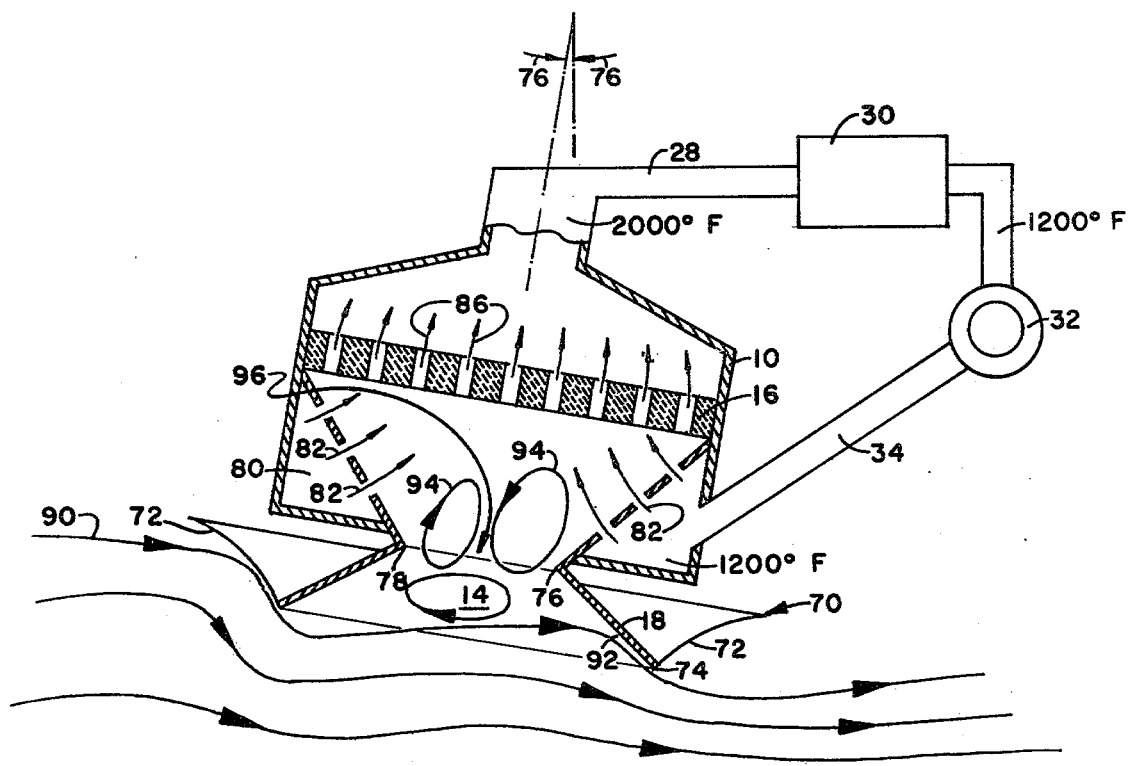
FIG. 3 is a sectional and diagrammatic illustration of the passive wind loss protection deflector for wind impinging on the receiver with a positive angle of attack.

In order to eliminate wind loss and referring to FIGS. 2 and 3, terminal concentrator 18 may be provided with a passive deflector 70 in the form of a backwardly projecting curved air foil having a face 72 at lip 74 of concentrator 18. It will be appreciated that lip 74 is the exposed lip of the concentrator. If a terminal concentrator is not used, this foil is located at the receiver aperture and, in general, surrounds the aperture.

It can be seen that receiver 10 is offset from the vertical as illustrated by arrows 76 by as much as 14 degrees. With wind coming in from the left as illustrated, this corresponds to a positive angle of attack which would ordinarily result in turbulent mixing at aperture 14 defined by the inner annulus 78 of the terminal concentrator.

It will be appreciated that receiver 10 is provided with an air inlet duct 80 which surrounds the face of the receiver cavity with inlet air provided at the face via apertures 82 such that the air flow is as illustrated by arrows 84 and 86. As can be seen, this air is made to flow through heat exchanger 16.

In operation, the primary flow stream 90 is deflected by face 72 of passive deflector 70 as illustrated. This provides a flow directed away from aperture 14 which affects the secondary flow streams and directs them away from the aperture. It should be noted that reattachment point 92 is on the leeward side of the terminal concentrator, well away from aperture 14. While the directing of the flow stream away from the aperture produces ambient vortices 94, these vortices contain very little energy. Thus, there is essentially a dead air zone 96 in the region of the aperture and ahead of the heat exchanger. Essentially the same operation takes place for the negative angle of attack in which the wind is coming in from the right as illustrated in FIG. 3. Here the primary flow stream 97 reattaches at point 98, again on the leeward side of terminal concentrator 18, thereby to provide the same type of dead air zone as illustrated in FIG. 2. Again, ambient vortices 94 are formed in aperture 14 such that wind coming in from the negative angle of attack illustrated does not significantly affect the operation of the receiver.

Figure 5:
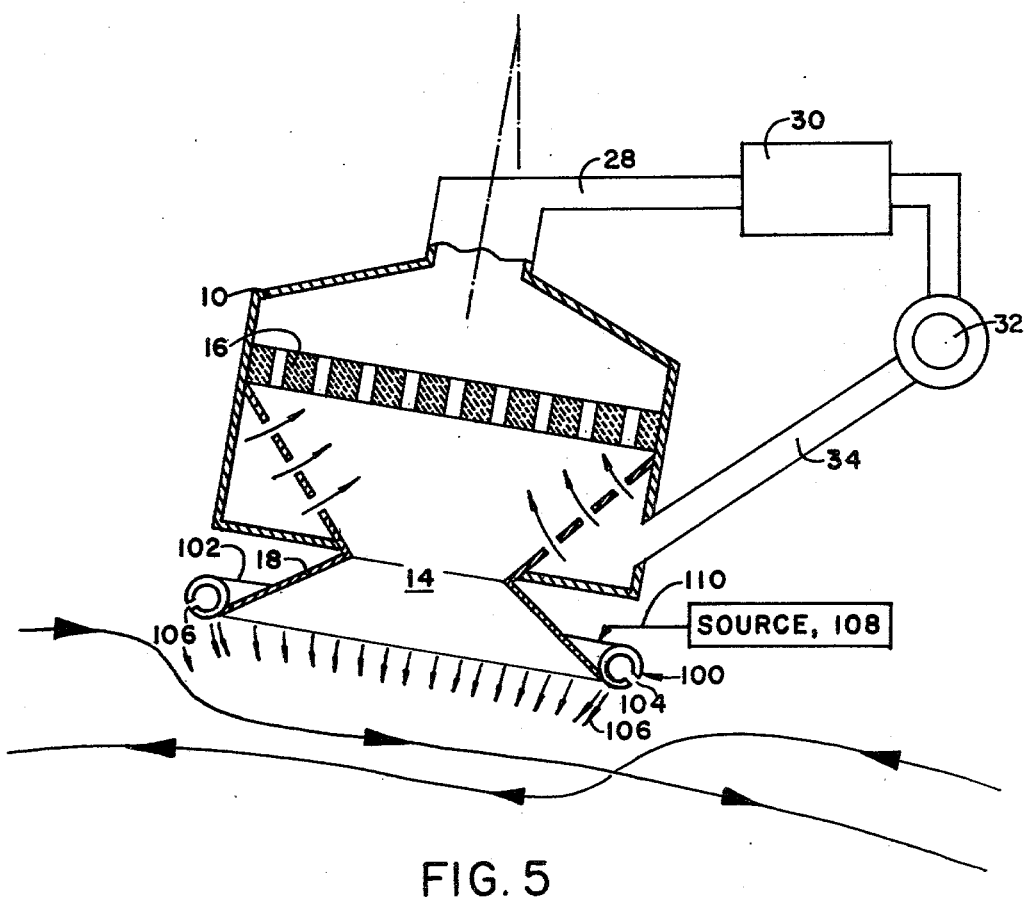
FIG. 5 is a sectional and diagrammatic illustration of an active heat loss protection system illustrating air jets provided annularly around the lip of the terminal concentrator for deflecting wind having either a positive or a negative angle of attack.

Referring now to FIG. 5, the passive deflector of FIGS. 2 and 3 may be eliminated in favor of an active system involving a flow jet deflector 100. This deflector, in a preferred embodiment, includes an annular ring 102 provided with an annular slot 104 through which air jets diagrammatically illustrated by arrows 106 are formed. Air for this purpose is provided by source 108 via line 100.

Figure 4:
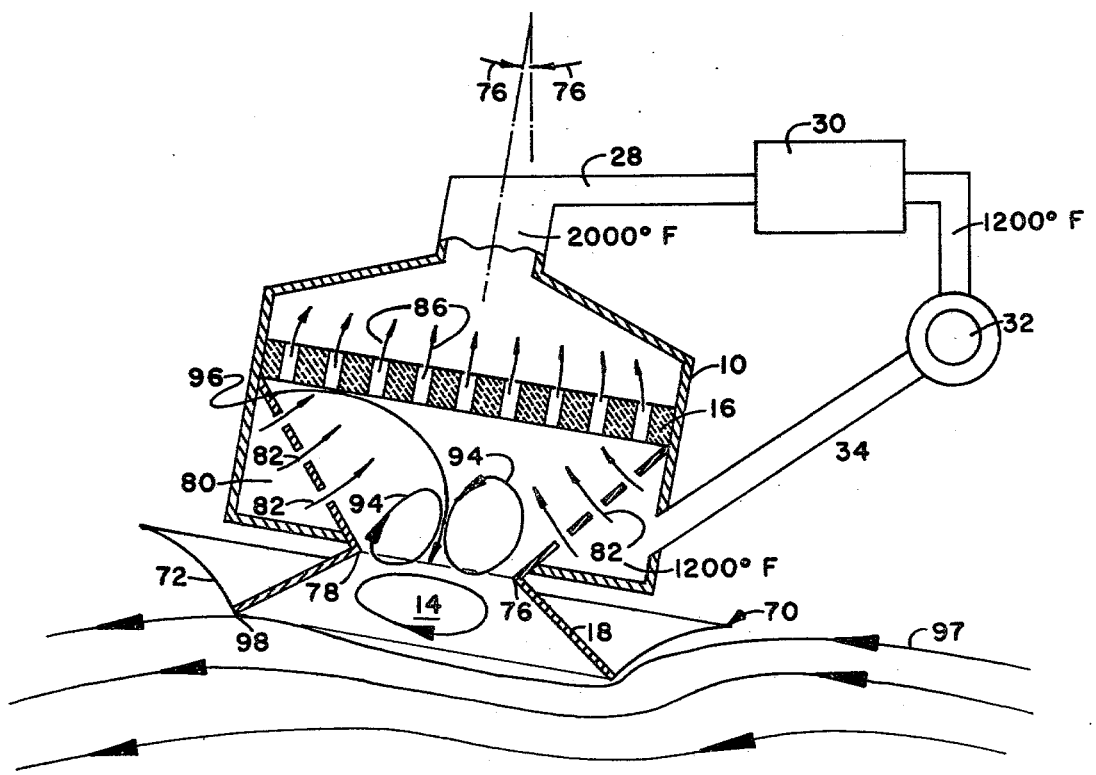
FIG. 4 is a sectional view and diagrammatic illustration of the same receiver/heat loss protection system illustrated in FIG. 2, with the wind impinging on the receiver with a negative angle of attack.

Alternatively, the air jets need only be formed along one-third to one-fourth the periphery of the ring for quadrant control. Receiver 10 illustrated in FIG. 4 is identical to the receivers illustrated in FIGS. 2 and 3, with the exception of the active flow jet deflector being provided at the lip of concentrator 18. Again, if a terminal concentrator is not used, the flow jet deflector is located at the receiver aperture.

In operation, for wind coming in from the left at a positive angle of attack, the wind is deflected completely away from aperture 14 by virtue of the positive action of the pressurized gas provided by the flow jet deflector. The same is true for winds coming in from the right at a negative angle of attack. This provides for a complete protection of the aperture of the receiver from ambient wind conditions by providing the aforementioned dead air zone immediately ahead of heat exchanger 16 at aperture 18.

In one operative embodiment the cone angle for the terminal concentrator ranged from 58° to 68°, depending on the F number of the mirror field utilized.

Although this invention has been shown and described with respect to preferred embodiments thereof, it should be understood by those skilled in the art that various changes and omissions in the form of details thereof may be made without departing from the spirit and scope of the invention.

We claim:

1. Apparatus for preventing heat loss in an open cavity solar energy receiver having an aperture at the open end, comprising:
    a wind deflector projecting outwardly from the aperture of said receiver;
    means for forming diverging jets of fluid projecting outwardly from said wind deflector at the ends of said deflector for deflecting airflow away from said open end such that the reattachment point, if any, is removed from said apparatus, said means including a fluid source feeding said fluid through a connecting conduit to the ends of said deflector.

2. The apparatus of claim 1 wherein said jet forming means includes an annular conduit and apertures therein for forming said jets.

3. The apparatus claimed in claim 1 wherein said deflector is an annular ring.

* * * * *